United States Patent [19]

Strolle et al.

[11] Patent Number: 5,274,464
[45] Date of Patent: Dec. 28, 1993

[54] SPATIAL FILTER FOR IMPROVED VHS SYSTEM

[75] Inventors: Christopher H. Strolle, Glenside, Pa.; Raymond A. Schnitzler, Highland Park, N.J.

[73] Assignee: SamSung Electronics Co. Ltd., Suwon, Rep. of Korea

[21] Appl. No.: 881,131

[22] Filed: May 11, 1992

Related U.S. Application Data

[63] Continuation-in-part of Ser. No. 657,029, Feb. 20, 1991, abandoned.

[51] Int. Cl.$^5$ .............................................. H04N 5/76
[52] U.S. Cl. .................................. 358/340; 358/335; 358/141; 358/12; 358/310; 358/328; 358/330; 360/33.1
[58] Field of Search ................. 358/330, 327, 340, 31, 358/12, 11, 141, 335, 310, 167, 328, 329, 36; 360/33.1, 30

[56] References Cited

U.S. PATENT DOCUMENTS

| | | | |
|---|---|---|---|
| 2,716,151 | 8/1955 | Smith | 358/12 |
| 4,831,463 | 5/1989 | Faroudja | 358/310 |
| 4,868,654 | 9/1989 | Juri et al. | 358/141 |

FOREIGN PATENT DOCUMENTS

WO-A9 006038  5/1990  World Int. Prop. O.

OTHER PUBLICATIONS

Software and Hardware Applications of Microcomputer, Publication of the International Society for MINI and Microcomputers-ISMM, Editors: M. H. Hamza and Lee.

Primary Examiner—Tommy P. Chin
Assistant Examiner—Khoi Truong
Attorney, Agent, or Firm—Robert E. Bushnell

[57] ABSTRACT

A television signal having a luminance spectrum extending from zero to $f_h$ in horizontal spatial frequencies and from zero to $f_v$ in vertical spatial frequencies is recorded on a video tape. A folded-spectrum signal is generated for recording by modulating the luminance signal onto a folding carrier of ($f_h/2$, $f_v/2$) complex spatial frequency. This is done by heterodyning the luminance signal with a folding carrier wave and then selecting as said folded-spectrum signal only the baseband portion of the resulting signal. At least when there is change between successive television images, the luminance signal is pre-filtered by a low-pass spatial filter that separates the two-dimensional image spectral domain into a pass band region and into an attenuation band region. Each point in the passed region has a corresponding mirror point in the attenuated region as mirrored about a complex spatial frequency ($f_h/4$, $f_v/4$) in both horizontal and vertical directions. During subsequent playback the folded-spectrum signal recovered from the tape is unfolded by heterodyning it with the folding carrier wave and selecting only the baseband portion of the resulting signal. At least when there is change between successive television images, the unfolded-spectrum signal is passed through a low-pass spatial reconstruction filter similar to that used as a recording pre-filter, and accompanying aliases are attenuated by the reconstruction filter.

17 Claims, 4 Drawing Sheets

FILTER IMPLEMENTATION (GENERAL)

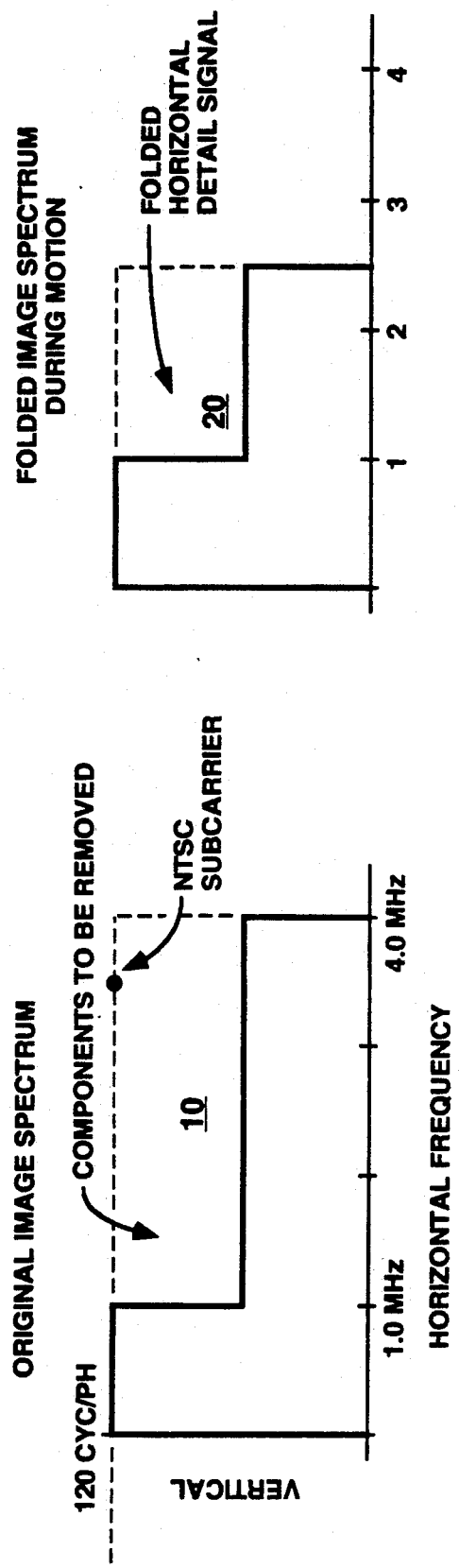
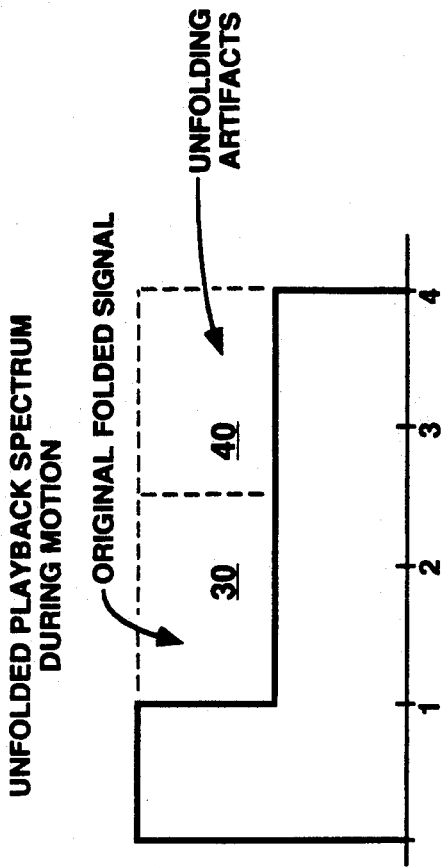

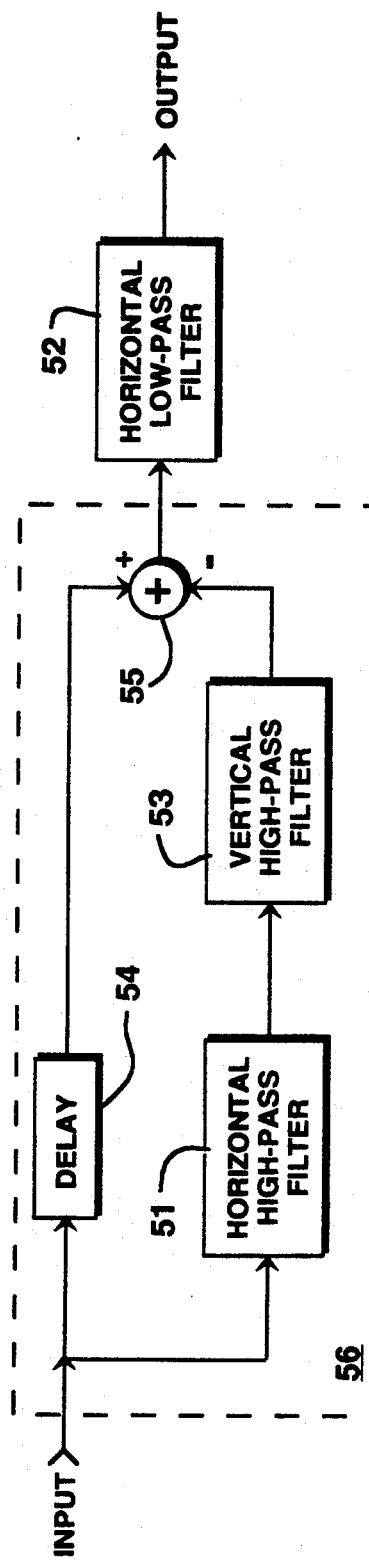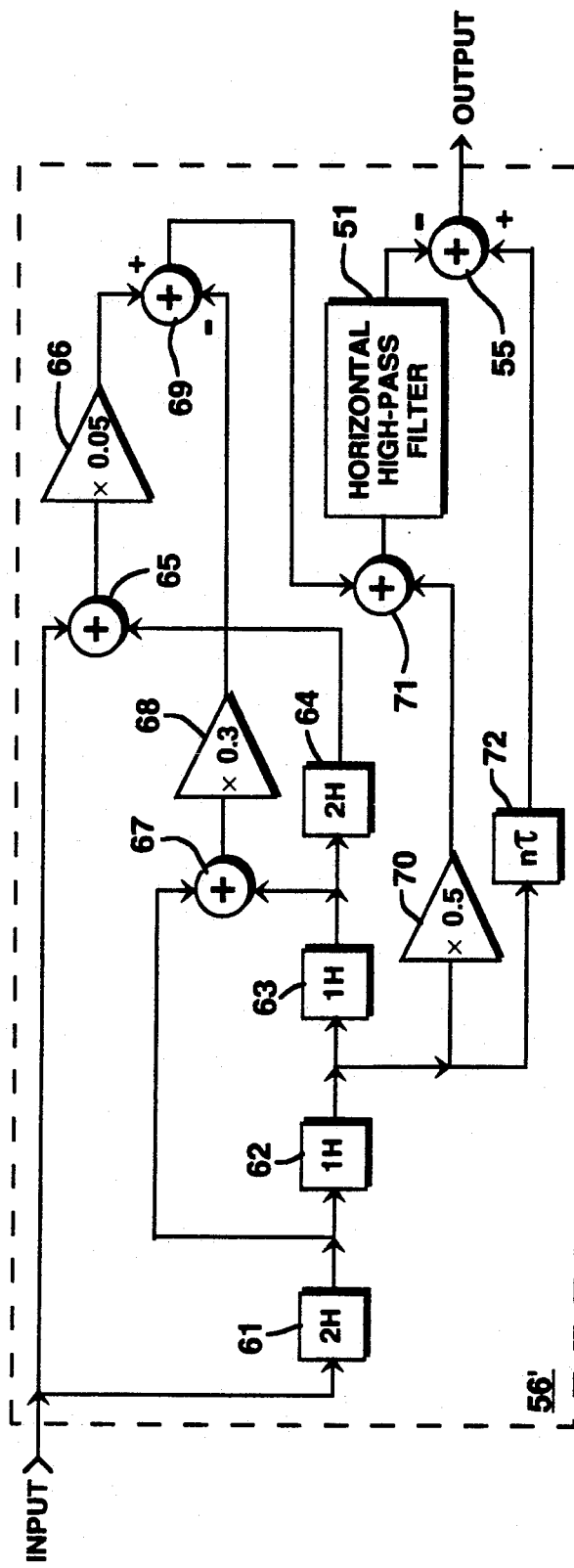
Fig. 3a FILTER IMPLEMENTATION (GENERAL)
Fig. 3b

SPATIAL FILTER FOR IMPROVED VHS SYSTEM

This is a continuation-in-part of patent application Ser. No. 07/657,029 filed Feb. 20, 1991, now abandoned.

The present invention relates to television systems and more particularly to television recording and playback systems.

BACKGROUND OF THE INVENTION

A problem with television tape recording systems such as the VHS system, has been the limited bandwidth and the resulting image degradation compared with, for example, images reproduced with the full NTSC standards. In the improved VHS System described in U.S. Pat. No. 5,113,262 issued May 12, 1992 on application Ser. No. 07/569,029 filed Aug. 17, 1990 entitled "VIDEO SIGNAL RECORDING SYSTEM ENABLING LIMITED BANDWIDTH RECORDING AND PLAYBACK", and incorporated herein by reference, the horizontal bandwidth of the playback image is increased to at least the full NTSC bandwidth by spectrum folding of the signal portions above 2.5 MHz during recording and by a corresponding unfolding during playback. Using known frame-averaging techniques using spectrum folding (such as that described by Faroudja in his U.S. Pat. No. 4,831,463 issued May 16, 1989 and entitled "VIDEO PROCESSING IN WHICH HIGH FREQUENCY LUMINANCE COMPONENTS ARE FOLDED INTO A MID-BAND SPECTRUM"), the reconstructed playback image is properly reproduced when it is still, with no artifacts resulting from the folding and unfolding. However, when motion is present in the picture, temporal reconstruction does not work properly, resulting in numerous artifacts such as blurring and residual folding dots. In an endeavor to correct such effects of motion in the picture, a spatial process has been used known as edge adaptive interpolation, as described in U.S. patent application No. U.S. patent application Ser. No. 07/562,907 filed Aug. 6, 1990, entitled "IMPROVING THE REMOVAL OF THE FOLDING CARRIER AND SIDEBANDS FROM AN UNFOLDED VIDEO SIGNAL" and assigned to Samsung Electronics Co., Ltd., herein incorporated by reference. Nevertheless, such an approach is not as satisfactory as might be desired.

SUMMARY OF THE INVENTION

In accordance with an aspect of the invention, a method using a spatial filter for a television recording and playback system using a spectral folding process, wherein the signal is modulated onto a folding carrier of $(f_h/2, f_v/2)$, comprises the steps of: separating the two-dimensional image spectral domain of the television signal into first and second regions that are either passed or attenuated, the partition between the regions being selected such that every point in the passed region has in the attenuated region a mirror point that is mirrored about $(f_h/4, f_v/4)$, the frequencies at the two points being mirror frequencies of each other; and reconstructing the passed region after playback.

In accordance with another aspect of the invention, a spatial prefilter is utilized in motion areas during recording and a high quality spatial reconstruction filter is utilized during playback in areas of motion.

In accordance with still another aspect of the invention, the prefilter removes unwanted diagonal frequency components present in the original image that otherwise interfere with the horizontal frequency components that get folded into the original signal during said spectral folding process.

In accordance with still yet another aspect of the invention, the reconstruction filter removes the unfolding artifacts that occupy the diagonal region from the playback spectrum of the unfolded image.

In accordance with a further aspect of the invention, apparatus using a spatial filter for a television recording and playback system using a spectral folding process, wherein the signal is modulated onto a folding carrier of $(f_h/2, f_v/2)$, comprises:

an arrangement for separating the two-dimensional image spectral domain of the television signal into first and second regions that are either passed or attenuated, the partition between said regions being selected such that every point in the passed region has a mirror point in the attenuated region that is mirrored about $(f_h/4, f_v/4)$, the frequencies at the two points being mirror frequencies of each other; and an arrangement for reconstructing the passed region after playback.

BRIEF DESCRIPTION OF THE DRAWING

FIGS. 2a, 2b, and 2c show spectral diagrams helpful to an understanding of the invention; and FIGS. 3a and 3b are block diagrams that show various signal processing arrangements in accordance with the invention.

DETAILED DESCRIPTION

Figure 1A:
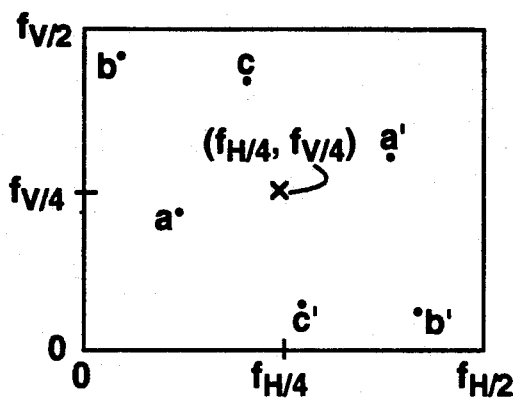
FIG. 1a, 1b, 1c, and 1d show various exemplary configurations of separating spectral regions, in a two-dimensional image spectral domain representation.

In accordance with an aspect of the invention, those spectral components that will give rise to alias components during spectrum folding in the recording process are symmetrically cleared out before spectrum folding. Thus, FIG. 1a shows the two-dimensional image spectral domain. In this representation, the vertical axis represents vertical frequencies and the horizontal axis represents horizontal frequencies. This representation is conveniently used in the art area of the present invention. See, for example, the article by the present inventor, "Cooperative Processing for Improved NTSC Chrominance/Luminance Separation", Christopher H. Strolle, SMPTE Journal, August 1986, pp. 782-789, herein incorporated by reference. This domain is separated into first and second regions that are either passed or attenuated, with the partition between the regions being selected such that every point in the passed region has a mirror point that is mirrored about ($f_h/4$, $f_v/4$) in the attenuated region. If in the folding process referred to above, the signal is modulated onto folding carrier of ($f_h/2$, $f_v/2$), there will be no overlap. Thus, the passed region can be properly reconstructed even after recording and playback limited to $f_h/4$, with the aliased attenuated region being fully eliminated.

Figure 1B:
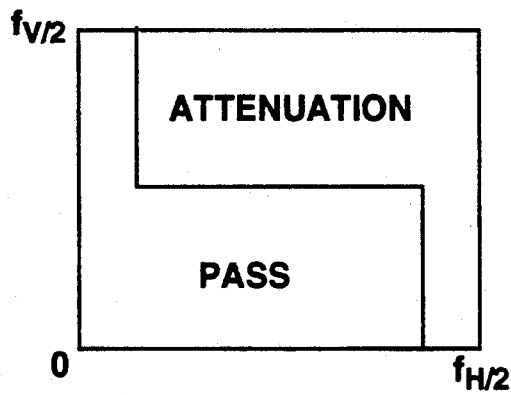
Figure 1D:
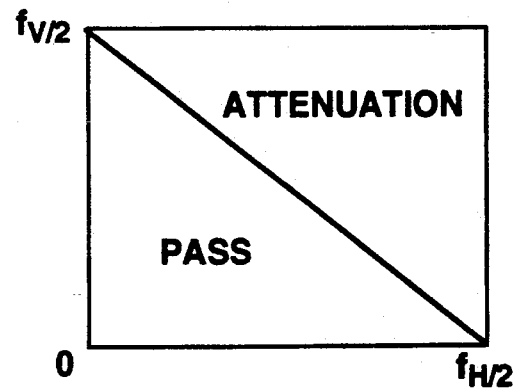
Figure 1C:
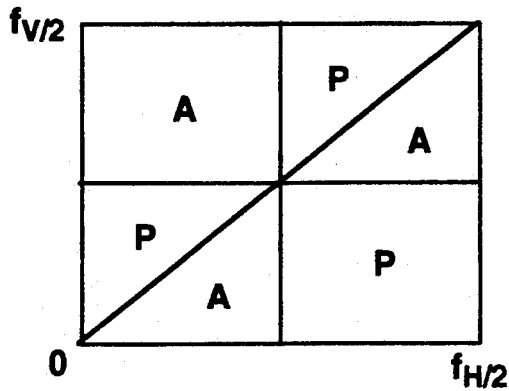

FIGS. 1b, 1c, and 1d respectively show various possible ways of apportioning the passed and attenuated regions. The selection of a particular configuration is subject to simplicity and economy of implementation as well as, to an extent, being dependent on human psychophysical visual sensitivity.

In accordance with a preferred embodiment of the invention, a high quality spatial prefilter is utilized in motion areas during recording and a high quality spatial reconstruction filter is utilized during playback in areas of motion. The function of the prefilter is to remove unwanted diagonal frequency components present in the original image that otherwise interfere with the horizontal frequency components that get folded into the original signal during the spectral folding process referred to above.

The reconstruction filter removes the unfolding artifacts that occupy the diagonal region to the playback spectrum of the unfolded image. FIG. 2a shows the original image spectrum, the components to be removed being in the region marked 10. FIG. 2b shows the folded image spectrum, with the folded horizontal detail signal being in the region marked 20. The unfolded playback spectrum is shown in FIG. 2c. The original folded signal is the region marked 30 and the unfolding artifacts are in the region marked 40.

In the present implementation, the prefilter and the reconstruction filter are provided by one and the same filter, suitably switched, but they may be two filters of the same type. In each case, the filter is a diagonal low-pass filter, but can be implemented with two horizontal filters 51 and 52 and a vertical filter 53, as shown in FIG. 3a.

In operation, the horizontal filter 51 is a high-pass filter, with a 6 dB cutoff at about 0.8 to 1 MHz (about $0.1f_h$), for example. The output of the horizontal high-pass filter 51 is applied to the input of the vertical filter. The vertical filter 53 is a halfband high-pass filter and so the output of the vertical filter 53 provides the diagonal frequencies that are to be removed. These diagonal frequencies exhibit a delay owing to the latencies of filters 51 and 53. A delay line 54 provides a compensating delay to the original input signal and the diagonal frequencies that are to be removed are subtracted from the delayed input signal in a subtractor 55. The resulting difference signal is then filtered with the horizontal filter 52, which is a horizontal low-pass filter cutting off at about 4–4.2 MHz (about $0.9f_h$), thereby producing the desired diagonal low-pass response at its output. The overall filter function is as shown, by way of example, in FIG. 1b. It is noted that this filter performs on the record side as a chroma reject filter while preserving the horizontal detail. The FIG. 3a filter is preferred over a classical diagonal filter structure first, because the realization described is more efficient in terms of hardware realization and second, it is much more straightforward to adjust the cutoff response in such a separable filter than otherwise.

FIG. 3b shows in detail a preferred filter structure to replace a portion 56 of the FIG. 3a filter. The FIG. 3b structure is based on a modification of the portion 56 of the FIG. 3a filter in which the vertical high-pass filter and the horizontal high-pass filter structure are cascaded in order opposite to that shown in FIG. 3a. This rearrangement permits a large portion of the delay 54 to be realized using delay elements shared by the vertical high-pass filter 53.

In FIG. 3b tapped delay line is provided by the cascade connection of a two-horizontal-scan-line delay line 61, one-horizontal-scan-line delay lines 62 and 63, and another two-horizontal-scan-line delay line 64. The INPUT signal applied as input signal to the delay line 61 and the output signal of delay line 63 are added in an adder 65, and the resultant sum is weighted by a factor +0.05 in a weighting amplifier 66. The output signals of delay lines 61 and 63 are added in an adder 67, and the resultant sum is weighted by a factor +0.3 in a weighting amplifier 68. An subtractor 69 subtracts from the weighted response of the weighting amplifier 66 the weighted response of the weighting amplifier 68. The output signal of delay line 62 is weighted by a factor +0.5 in a weighting amplifier 70, and the weighted response from the weighting amplifier 70 is added in an adder 71 to the sum signal from the adder 69, thereby to generate a vertical high-pass filter response to the INPUT signal.

This vertical high-pass filter response to the INPUT signal is supplied as input signal to the horizontal high-pass filter 51. Elements 61–71 are, then, identifiable with the vertical high-pass filter 53 as rearranged to precede the horizontal high-pass filter 51 in their cascade connection with each other. The vertical high-pass filter response to the INPUT signal furnished by the adder 71 has a 3H delay therethrough, H being the duration of one horizontal scan line, which 3H delay may be identified as corresponding with the delay through the vertical high-pass filter 53. The horizontal high-pass filter 51 is an (2N+1)-tap digital finite-impulse-response filter having a delay $N\tau$ therethrough. The delay line 54 would, then, have a delay of (3H+$N\tau$) therethrough to compensate for the delay through the cascaded filters 51 and 53. In FIG. 3b 3H of this delay of (3H+$N\tau$) is provided by the cascaded 2H delay line 61 and 1H delay line 62, and the remaining $N\tau$ delay is provided by a relatively short delay line 72.

Figure 4A:
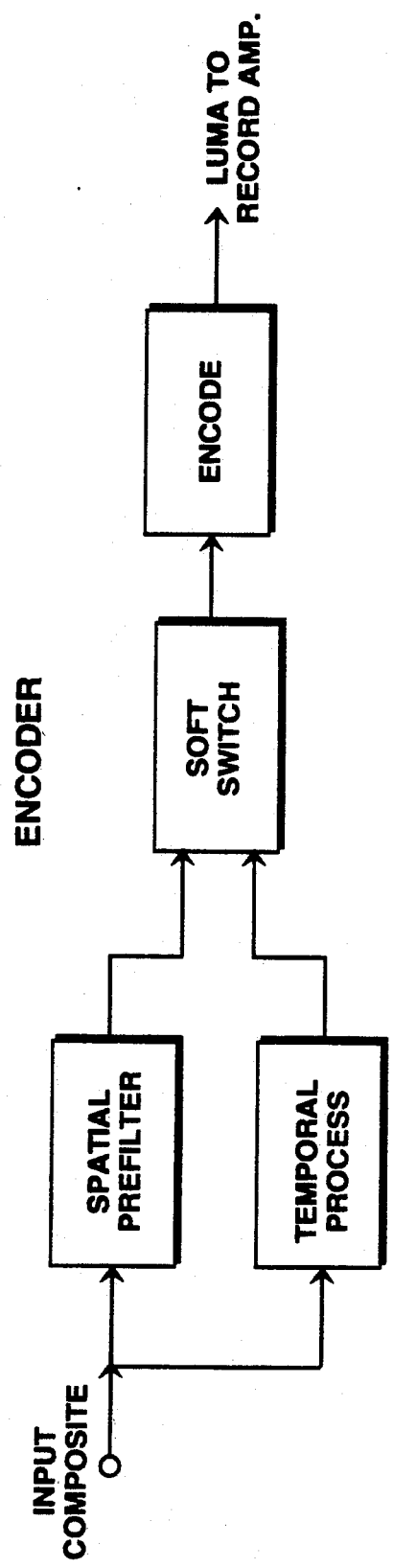
FIG. 4a is a block diagram of the encoder portion of the improved VHS System described in U.S. Pat. No. 5,113,262 issued May 12, 1992 and entitled "VIDEO SIGNAL RECORDING SYSTEM ENABLING LIMITED BANDWIDTH RECORDING AND PLAYBACK" in which the spatial pre-filter is constructed in accordance with the invention.

FIG. 4a shows the incorporation of a spatial prefilter embodying the invention into video tape recording electronics of the sort shown in FIG. 3 of U.S. patent application Ser. No. 569,029 filed Aug. 17, 1990. Digitized composite video signal is supplied through an input connection INPUT COMPOSITE that corresponds to terminal 205 in FIG. 3 of U.S. patent application Ser. No. 569,029. The SPATIAL PREFILTER, providing filtering in accordance with the precepts of the invention herein claimed, corresponds to elements 202, 212 and 208 in FIG. 3 of U.S. patent application Ser. No. 569,029. The TEMPORAL PROCESS block comprises elements 204 and 216 in FIG. 3 of U.S. patent application Ser. No. 569,029. The SOFT SWITCH block corresponds to element 214 in FIG. 3 of U.S. patent application Ser. No. 569,029. The ENCODE block corresponds to the adaptive frequency-folding circuitry in the IVHS, as exemplified by the circuitry shown in FIG. 6 of U.S. patent application Ser. No. 569,029.

Figure 4B:
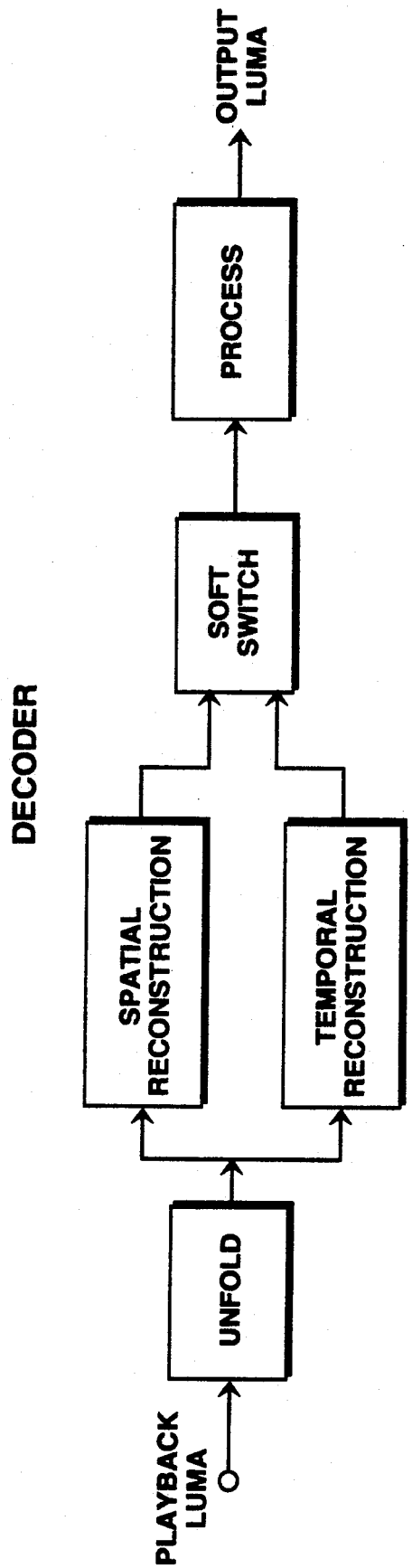
FIG. 4b is a block diagram of the decoder portion of the improved VHS System described in U.S. Pat. No. 5,113,262 issued May 12, 1992 and entitled "VIDEO SIGNAL RECORDING SYSTEM ENABLING LIMITED BANDWIDTH RECORDING AND PLAYBACK" in which the spatial reconstruction filter is constructed in accordance with the invention.

FIG. 4b shows the incorporation into video tape recording electronics of a spatial reconstruction filter embodying the invention. The UNFOLD block corresponds to the adaptive frequency-folding circuitry in the IVHS, as exemplified by the circuitry shown in FIG. 10 of U.S. patent application Ser. No. 569,029. The SPATIAL RECONSTRUCTION block, providing filtering in accordance with the precepts of the invention herein claimed, corresponds to the adaptive spatial low-pass filter 1006 in FIG. 11 of U.S. patent application Ser. No. 569,029. The TEMPORAL RECONSTRUCTION block corresponds to the temporal low-pass filter 1004 in FIG. 11 of U.S. patent application Ser. No. 569,029. The SOFT SWITCH block corresponds to element 1008 in FIG. 11 of U.S. patent application Ser. No. 569,029. The PROCESS BLOCK corresponds to the adaptive peaker 1010 in FIG. 11 of U.S. patent application Ser. No. 569,029. While the present invention has been described by way of exemplary embodiments, it will be understood by those skilled in the art that various changes can be introduced without departing from the spirit of the invention. It is thus, at least in principle, possible to implement various functions in digital or analog technology. It is also possible to vary the exact arrangement of the attenuated and passed regions.

What is claimed is:

1. A method for recording on a recording medium a television signal describing a sequence of television images and for subsequently playing back from said recording medium thus recorded a replica of said television signal, said television signal having a two-dimensional image spectral domain extending from zero to $f_h$ in horizontal spatial frequencies and from zero to $f_v$ in vertical spatial frequencies, said method for use with a television recording and playback system including a spatial filter having a filtering characteristic capable of responding to said television signal for separating the two-dimensional image spectral domain into a first region that is a pass band and into a second region that is an attenuation band, a partition between said regions being such that each point in the passed region has a corresponding mirror point in the attenuated region, the respective frequencies of any point in the passed region and its corresponding mirror point in the attenuated region being mirror frequencies of each other as mirrored about a complex spatial frequency $(f_h/4, f_v/4)$ in both a horizontal direction and a vertical direction in said two-dimensional image spectral domain—said method during a recording procedure comprising the steps of:

using a spectral folding process for generating a folded-spectrum signal in which a portion of said television signal is modulated onto a folding carrier of $(f_h/2, f_v/2)$ complex spatial frequency, which step includes substeps of heterodyning said portion of said television signal with a folding carrier wave and selecting as said folded-spectrum signal only the baseband portion of the signal resulting from said substep of heterodyning;

recording said folded-spectrum signal on said recording medium; and at least at times when there is change between a television image currently described by said television signal and a preceding television image described by said television signal, processing said television signal through said spatial filter to generate said portion of said television signal that is modulated onto said folding carrier of $(f_h/2, f_v/2)$ complex spatial frequency—said method during a playback procedure subsequent to said recording procedure comprising the further steps of:

recovering said folded-spectrum signal from said recording medium;

unfolding said folded-spectrum signal to generate an unfolded-spectrum signal, which step includes substeps of heterodyning said folded-spectrum signal with said folding carrier wave and selecting as said unfolded-spectrum signal only the baseband portion of the signal resulting from said substep of heterodyning said folded-spectrum signal; and generating a replica of said television signal from said unfolded-spectrum signal, which step includes a substep of at least at times when there is change between a television image currently described by said unfolded-spectrum signal and a preceding television image described by said unfolded-spectrum signal, processing said unfolded-spectrum signal through said spatial filter.

2. A method in accordance with claim 1, wherein during said recording procedure the filtering characteristic of said spatial filter removes unwanted diagonal frequency components present in the sequence of television images described by said television signal that would otherwise interfere with the horizontal frequency components that get folded into the original signal during said step of using a spectral folding process.

3. A method in accordance with claim 1, wherein during said playback procedure said spatial filter removes unfolding artifacts that occupy the diagonal region in the two-dimensional image spectral domain of the signal resulting from the substep of heterodyning in said step of unfolding said folded-spectrum signal so said unfolded-spectrum signal is substantially freed of the unfolding artifacts appearing therein.

4. A television recording and playback system for recording on a recording medium a television signal describing a sequence of television images and for subsequently playing back from said recording medium thus recorded a replica of said television signal, said television signal having a two-dimensional image spectral domain extending from zero to $f_h$ in horizontal spatial frequencies and from zero to $f_v$ in vertical spatial frequencies, which system includes in addition to means operative during recording for generating a folded-spectrum signal by a spectral folding process in which a portion of said television signal is modulated onto a folding carrier of $(f_h/2, f_v/2)$ complex spatial frequency;

means operative during recording for recording said folded-spectrum signal on said recording medium;

means operative during playback for recovering said folded-spectrum signal from said recording medium;

means operative during playback for unfolding said folded-spectrum signal to generate an unfolded-spectrum signal; and means operative during playback for generating a replica of said television signal from said unfolded-spectrum signal as applied thereto;

the improvement comprising:

a spatial filter having a filtering characteristic capable of responding to said television signal for separating the two-dimensional image spectral domain into a first region that is a pass band and into a second region that is an attenuation band, a partition between said regions being such that each point in the passed region has a corresponding mirror point in the attenuated region, the respective frequencies of any point in the passed region and its corresponding mirror point in the attenuated region being mirror frequencies of each other as mirrored about a complex spatial frequency $(f_h/4, f_v/4)$ in both horizontal and vertical directions in said two-dimensional image spectral domain, said spatial filter being connected during recording within said means for generating a folded-spectrum signal by a spectral folding process so that (at least at times when there is change between a television image currently described by said television signal and a preceding television image described by said television signal) said television signal is processed through said spatial filter to generate said portion of said television signal that is modulated onto said folding carrier of $(f_h/2, f_v/2)$ complex spatial frequency, said spatial filter being connected during playback so that (at least at times when there is change between a television image currently described by said unfolded-spectrum signal and a preceding television image described by said unfolded-spectrum signal) said unfolded-spectrum signal is processed through said spatial filter in its application to said means for generating a replica of said television signal from said unfolded-spectrum signal.

5. A television recording and playback system in accordance with claim 4, wherein said spatial filter removes unwanted diagonal frequency components present in the sequence of television images described by said television signal that would otherwise interfere with the horizontal frequency components that get folded into the original signal during said spectral folding process.

6. A television recording and playback system in accordance with claim 4, wherein said spatial filter removes a unfolding artifacts that would otherwise occupy the diagonal region in the two-dimensional image spectral domain of the unfolded-spectrum signal.

7. A television recording and playback system in accordance with claim 4, wherein said spatial filter is a diagonal low-pass filter, but is implemented as two horizontal filters and a vertical filter.

8. A method for recording on a recording medium a television signal describing a sequence of television images, said television signal having a two-dimensional image spectral domain extending from zero to $f_h$ in horizontal spatial frequencies and from zero to $f_v$ in vertical spatial frequencies, said method for use with a television recording and playback system including a spatial filter having a filtering characteristic capable of responding to said television signal for separating the two-dimensional image spectral domain into a first region that is a pass band and into a second region that is an attenuation band, a partition between said regions being such that each point in the passed region has a corresponding mirror point in the attenuated region, the respective frequencies of any point in the passed region and its corresponding mirror point in the attenuated region being mirror frequencies of each other as mirrored about a complex spatial frequency $(f_h/4, f_v/4)$ in both horizontal and vertical directions in said two-dimensional image spectral domain, said method comprising the steps of:

using a spectral folding process for generating a folded-spectrum signal in which a portion of said television signal is modulated onto a folding carrier of $(f_h/2, f_v/2)$ complex spatial frequency, which step includes substeps of heterodyning said portion of said television signal with a folding carrier wave and selecting as said folded-spectrum signal only the baseband portion of the signal resulting from said substep of heterodyning;

recording said folded-spectrum signal on said recording medium; and at least at times when there is change between a television image currently described by said television signal and a preceding television image described by said television signal, processing said television signal through said spatial filter to generate said portion of said television signal that is modulated onto said folding carrier of $(f_h/2, f_v/2)$ complex spatial frequency.

9. A method in accordance with claim 8, wherein the filtering characteristic of said spatial filter is such as to remove unwanted diagonal frequency components present in the sequence of television images described by said television signal, which unwanted diagonal frequency components would otherwise interfere with the horizontal frequency components that get folded into the original signal during said step of using a spectral folding process.

10. A method for recovering from a recording medium a replica of a television signal describing a sequence of television images, said television signal and its replica each having a two-dimensional image spectral domain extending from zero to $f_h$ in horizontal spatial frequencies and from zero to $f_v$ in vertical spatial frequencies, said method for use with a television recording playback system including a spatial filter having a filtering characteristic capable of responding to said television signal for separating the two-dimensional image spectral domain into a first region that is a pass band and into a second region that is an attenuation band, a partition between said regions being such that each point in the passed region has a corresponding mirror point in the attenuated region, the respective frequencies of any point in the passed region and its corresponding mirror point in the attenuated region being mirror frequencies of each other as mirrored about a complex spatial frequency $(f_h/4, f_v/4)$ in both horizontal and vertical directions in said two-dimensional image spectral domain, said method comprising the steps of:

recovering said folded-spectrum signal from said recording medium;

unfolding said folded-spectrum signal to generate an unfolded-spectrum signal, which step includes substeps of heterodyning said folded-spectrum signal with a folding carrier wave and selecting as said unfolded-spectrum signal only the baseband portion of the signal resulting from said substep of heterodyning; and generating said replica of said television signal from said unfolded-spectrum signal, which step includes a substep of at least at times when there is change between a television image currently described by said unfolded-spectrum signal and a preceding television image described by said unfolded-spectrum signal, processing said unfolded-spectrum signal through said spatial filter.

11. A method in accordance with claim 10, wherein said spatial filter removes unfolding artifacts that occupy the diagonal region in the two-dimensional image spectral domain of the signal resulting from the substep of heterodyning in said step of unfolding said folded-spectrum signal, so said unfolded-spectrum signal is substantially freed of the unfolding artifacts appearing therein.

12. A television recording system for recording on a recording medium a television signal describing a sequence of television images, said television signal having a two-dimensional image spectral domain extending from zero to $f_h$ in horizontal spatial frequencies and from zero to $f_v$ in vertical spatial frequencies, which system includes in addition to means for generating a folded-spectrum signal by a spectral folding process in which a portion of said television signal is modulated onto a folding carrier of ($f_h/2$, $f_v/2$) complex spatial frequency; and means for recording said folded-spectrum signal on said recording medium;

the improvement comprising:

a spatial filter having a filtering characteristic capable of responding to said television signal for separating the two-dimensional image spectral domain into a first region that is a pass band and into a second region that is an attenuation band, a partition between said regions being such that each point in the passed region has a corresponding mirror point in the attenuated region, the respective frequencies of any point in the passed region and its corresponding mirror point in the attenuated region being mirror frequencies of each other as mirrored about a complex spatial frequency ($f_h/4$, $f_v/4$) in both horizontal and vertical directions in said two-dimensional image spectral domain, said spatial filter being connected within said means for generating a folded-spectrum signal by a spectral folding process so that (at least at times when there is change between a television image currently described by said television signal and a preceding television image described by said television signal) said television signal is processed through said spatial filter to generate said portion of said television signal that is modulated onto said folding carrier of ($f_h/2$, $f_v/2$) complex spatial frequency.

13. A television recording system in accordance with claim 12, wherein said spatial filter removes unwanted diagonal frequency components present in the sequence of television images described by said television signal that would otherwise interfere with the horizontal frequency components that get folded into the original signal during said spectral folding process.

14. A television recording system in accordance with claim 12, wherein said spatial filter is a diagonal low-pass filter, but is implemented as two horizontal filters and a vertical filter.

15. A television-recording playback system for playing back from a recording medium a replica of a television signal that was modulated, onto a folding carrier of ($f_h/2$, $f_v/2$) complex spatial frequency in a spectral folding process carried out before recording said television signal in said recording medium, said television signal having a two-dimensional image spectral domain extending from zero to $f_h$ in horizontal spatial frequencies and from zero to $f_v$ in vertical spatial frequencies, which system includes in addition to means for recovering said folded-spectrum signal from said recording medium;

means for unfolding said folded-spectrum signal to generate an unfolded-spectrum signal; and means for generating a replica of said television signal from said unfolded-spectrum signal as applied thereto;

the improvement comprising:

a spatial filter having a filtering characteristic capable of responding to said television signal for separating the two-dimensional image spectral domain into a first region that is a pass band and into a second region that is an attenuation band, a partition between said regions being such that each point in the passed region has a corresponding mirror point in the attenuated region, the respective frequencies of any point in the passed region and its corresponding mirror point in the attenuated region being mirror frequencies of each other as mirrored about a complex spatial frequency ($f_h/4$, $f_v/4$) in both horizontal and vertical directions in said two-dimensional image spectral domain, said spatial filter being connected so that (at least at times when there is change between a television image currently described by said unfolded-spectrum signal and a preceding television image described by said unfolded-spectrum signal) said unfolded-spectrum signal is processed through said spatial filter in its application to said means for generating a replica of said television signal from said unfolded-spectrum signal.

16. A television-recording playback system in accordance with claim 15, wherein said spatial filter removes unfolding artifacts that would otherwise occupy the diagonal region in the two-dimensional image spectral domain of the unfolded-spectrum signal.

17. A television-recording playback system in accordance with claim 16, wherein said spatial filter is a diagonal low-pass filter, but is implemented as two horizontal filters and a vertical filter.

* * * * *